July 19, 1966 R. E. MANOLL 3,261,760
QUICK OPENING LATCH AND ANTI-VIBRATION LOCK FOR
NUCLEAR REACTOR SAFETY ROD
Filed Nov. 27, 1964 4 Sheets-Sheet 1

INVENTOR.
ROY E. MANOLL
BY

July 19, 1966

R. E. MANOLL 3,261,760

QUICK OPENING LATCH AND ANTI-VIBRATION LOCK FOR
NUCLEAR REACTOR SAFETY ROD

Filed Nov. 27, 1964

INVENTOR.
ROY E. MANOLL
BY

INVENTOR.
ROY E. MANOLL

United States Patent Office 3,261,760
Patented July 19, 1966

3,261,760
QUICK OPENING LATCH AND ANTI-VIBRATION
LOCK FOR NUCLEAR REACTOR SAFETY ROD
Roy E. Manoll, Idaho Falls, Idaho, assignor to the United
States of America as represented by the United States
Atomic Energy Commission
Filed Nov. 27, 1964, Ser. No. 414,480
8 Claims. (Cl. 176—86)

The present invention concerns a quick opening latch and anti-vibration lock for use in attaching neutron poison material to a safety rod in a nuclear reactor.

In the design of the advanced test reactor (ATR) safety rods, a hafnium plate is used as the poison section. After about seventeen days of operation the core is refueled and the hafnium plate is replaced. The plate must be attached in such a way as to permit quick removal and at the same time be secured against any vertical motion.

No such design has heretofore been available which incorporates these features. By this invention it is possible to provide for the degree of security, ease of removal and replacement heretofore unobtainable.

In accordance with this invention, each poison section is inserted into prepared grooves in the safety rods and a locking pin is provided which is readily secured in place to prevent relative vertical motion between the parts.

It is thus a first object of this invention to provide apparatus for the quick removal and replacement of poison sections on a reactor safety rod.

It is a further object of this invention to provide an anti-vibration lock for use in attaching poison sections to the safety rods in a nuclear reactor.

Still another object of the invention is the provision of a combination quick opening latch and anti-vibration lock.

Other objects and advantages of this invention will hereinafter become obvious from the following description of a preferred embodiment of this invention taken with the accompanying drawings in which.

Figure 1A:
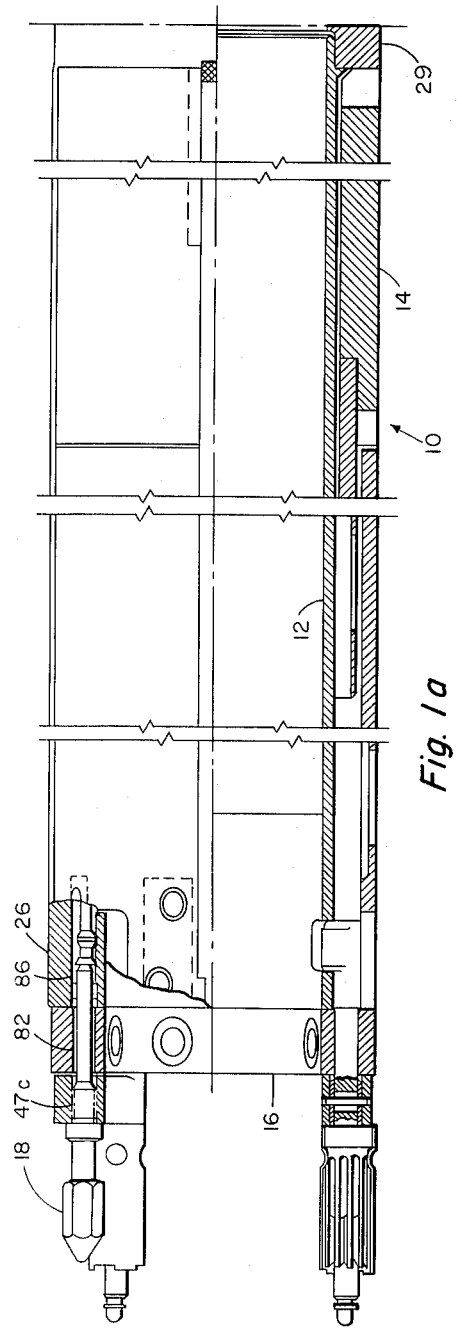
FIGS. 1a and 1b show an elevation view in section of a safety rod embodying the principles of this invention.
Figure 1B:
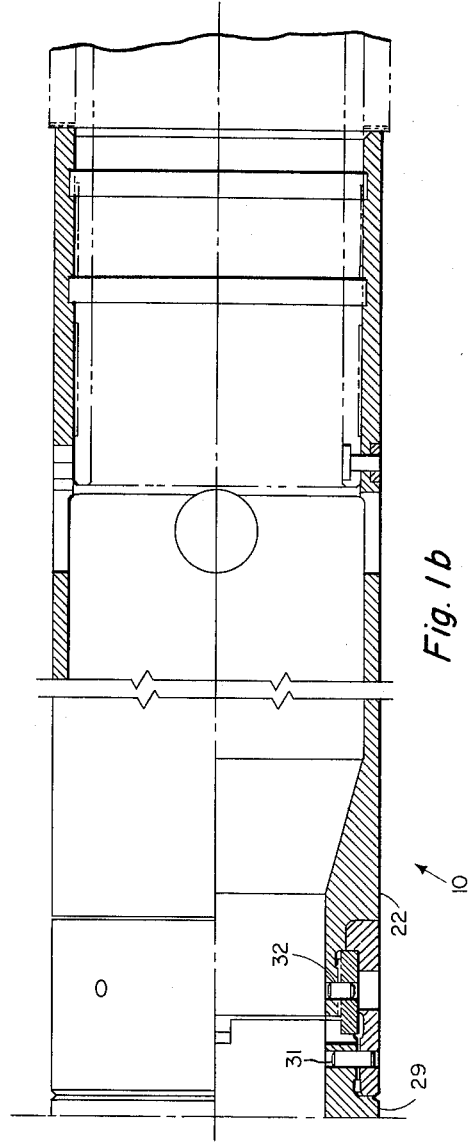

Safety rod assembly 10 shown in FIGS. 1a and 1b consists of a cylindrical guide tube 12, four identical flux trap filler assemblies 14, mounted on the outside of tube 12, four absorber plate assemblies 16, four flux wire assemblies 18, and a drive connection assembly 22 shown in FIG. 1b. The upper end of assembly 10 is the left side shown in FIG. 1a. Flux wire assemblies 18, flux trap filler assemblies 14 and drive connection assembly 22 do not form a part of this invention and are shown only to show their general use in the safety rod assembly 10.

Figure 13:
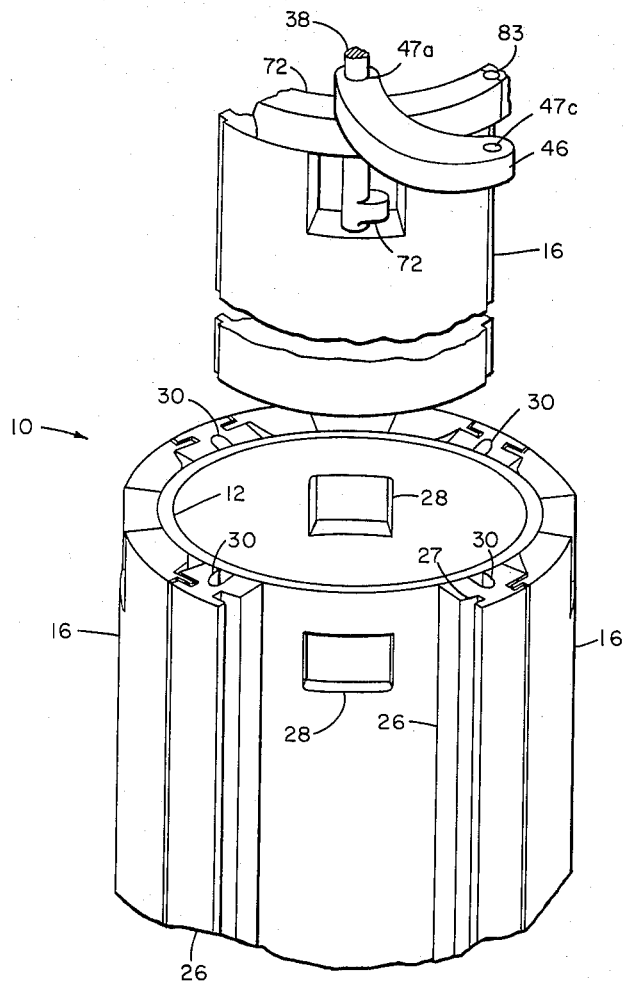
FIG. 13 is a view of the assembly in perspective with one of the absorber plate assemblies partially removed.

Guide tube 12 is cylindrical and has four guides 26 with grooves 27 arranged along the circumference thereof parallel to its long axis and disposed 90° apart, as best shown in FIG. 13. The upper end of each guide 26 is provided with an opening 30 to accommodate absorber assemblies 16 which carry the poison material as to be described below. Four rectangular openings 28 are located on the side and near the upper end of member 12. An end fitting 29, shown in FIG. 1b is provided to permit attachment of drive connection assembly 22. Several dowels 31 and 32, welded in place, accomplish this attachment.

Figure 3:
FIG. 3 is a top view of the assembly shown in FIG. 2.
Figure 2:
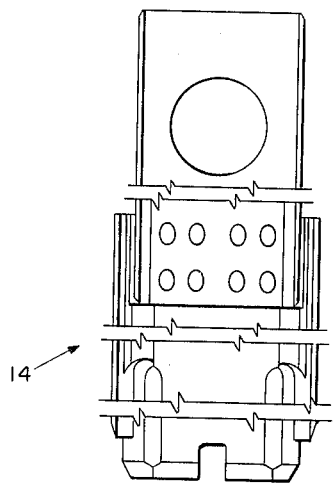
FIG. 2 is an elevation view of a flux trap filler assembly used on the safety rod.

Each flux trap filler assembly 14, shown in FIGS. 2 and 3 is annular in shape occupying an angle less than 90° to fit between adjacent guides 26.

Absorber plate assemblies 16 are attached to the outside adjacent the upper end of guide tube 12 as illustrated in FIGS. 1a and 13. The invention essentially is in the construction to lock assemblies 16 in place so as not to vibrate in service and to permit their ready release when it is necessary to replace the absorber material forming a part of each of these assemblies.

Figure 4:
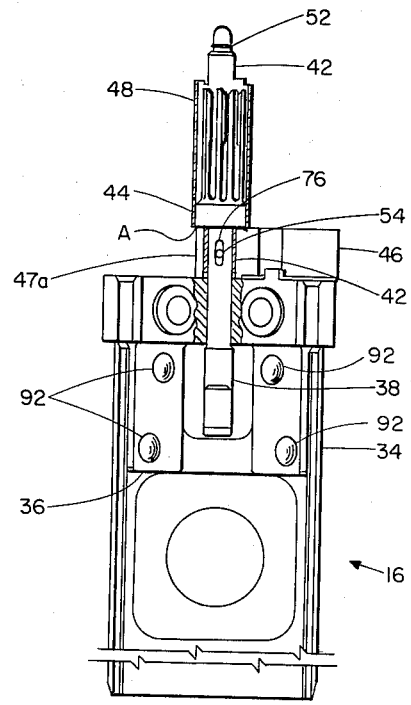
FIG. 4 is an elevation view of an absorber plate assembly.
Figure 6:
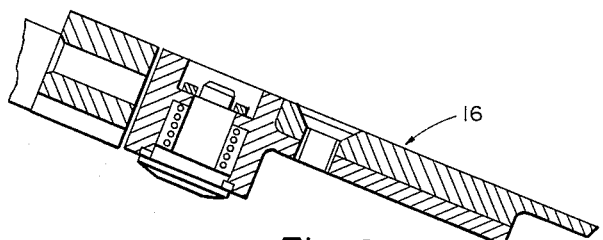
FIG. 6 is a view along 6—6 of FIG. 5.
Figure 5:
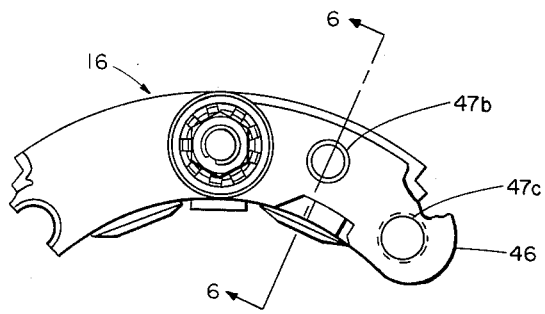
FIG. 5 is a top view of the assembly shown in FIG. 4.
Figure 11:
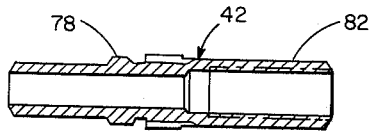
FIG. 11 is a section view of the special nut.
Figure 12:
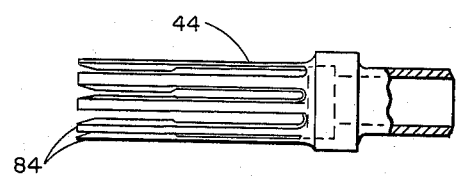
FIG. 12 is a view of the locking spring.
Figure 10:
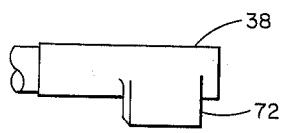
FIG. 10 is a view along 10—10 of FIG. 9.
Figure 8:
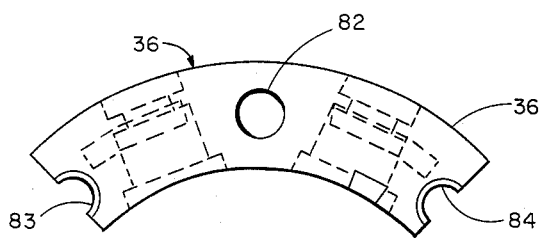
FIG. 8 is a plan view of the retainer segment shown in FIG. 7.

The details of each absorber assembly 16 are shown in FIGS. 4–12. There it will be seen that assembly 16 consists of an absorber plate 34 (FIG. 4) made from suitable poison material such as hafnium which forms a circular arc less than 90°, a retainer segment 36 similarly shaped (FIG. 7), a hold down pin 38 (FIG. 9), a special nut 42 (FIG. 11), a locking spring 44 (FIG. 12), a hold-down handle 46 with holes 47a, 47b and 47c (FIGS. 5 and 13), a cylindrical locking spring shield 48 (FIG. 4), a retaining ring 52 (FIG. 4) and a dowel 54 (FIG. 4). Retainer segment 36, referring to FIG. 7 has a pair of arms 56 and 58 with countersunk openings 62, 64 and 66, 68 and an upper body portion 72. The latter has a pair of radially extending holes 74 and 76, a protruding stop 78, a hole 82 with its axis parallel to arms 56 and 58, and "half holes" 83 and 84 which mate with adjacent "half-holes" in adjoining segments 36 to form a total of eight holes when all four segments 36 are assembled on guide tube 12 as shown in FIG. 1a. Hold-down pin 38 is cylindrical and has a short transverse boot 72 at one end, a spherical tip 74 at the opposite end, a slot 76 to accommodate dowel 54 as will be later seen, and a threaded portion 77.

Hollow nut 42 is generally cylindrical in shape with hexagonal portion 78 and lengthwise ribs or ridges 82. Locking spring 44 is cylindrical with flexible spring-like tabs 84 which as will be seen later, engage ridges 82 of nut 42. It is readily apparent that clamping of tabs 84 on ridges 82 will prevent rotation of nut 42.

The purpose of absorber assembly 16 is to attach absorber plate 34 to safety rod assembly 10 and permit its ready removal and replacement as well as to permit the carrying out of the principles of this invention as stated above.

It is necessary to assemble absorber plate assembly 16 before attaching the latter to safety rod assembly 10. To do this, hold-down pin 38 is inserted through hole 82 in retainer segment 36. Hold-down handle 46 is placed over hold-down pin 38 as shown in FIGS. 1a, 4 and 13. Locking spring 44 is placed over hold-down pin 38 and into hold-down handle 46. Dowel 54 is inserted through slot 76 in pin 38 and matching holes (not shown) in hold-down handle 46 and locking spring 44 so that these three parts will rotate as one. Locking spring shield 48 is then placed over locking spring 44 as shown and welded to handle 46 at A. Shield 48 protects tabs 84 from damage as might be incurred if tabs 84 are expanded outwardly beyond their spring limit. Retainer segment 36 is attached to absorber plate 34 by countersunk rivets 92 in holes 62–68.

Figure 9:
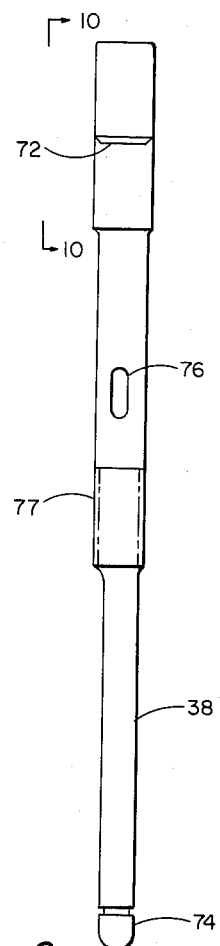
FIG. 9 shows the hold down pin.
Figure 7:
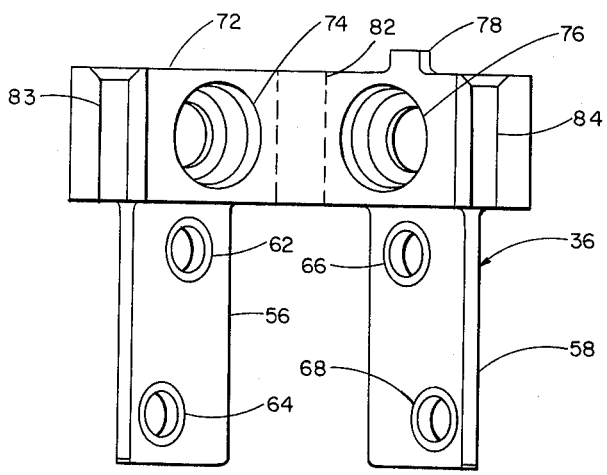
FIG. 7 is an elevation view of a retainer segment used in the absorber plate assembly.

To assembly safety rod assembly 10, each absorber plate assembly 16 is placed on guide tube assembly 12 into guide grooves 27, as shown in FIG. 13, so that holes 83 and 84 are aligned with matching openings 30 in guides 26. To lock absorber plate assembly 16 in place, a suitable special socket wrench which disengages the spring tabs is attached to locking spring shield 48, and hold-down handle 46 is rotated counter clockwise until hole 47c aligns with hole 83, as shown in FIG. 13. A flux wire assembly 18, as seen in FIG. 1a, not forming a part of this invention, is then inserted through hole 47c in handle 46 into hole 83 and hole 86 in guide 26 and threaded into place. Then special nut 42 is placed over hold-down pin 38 as shown in FIG. 4 to engage threads 77. With the aid of a socket wrench which spreads locking tabs 84 of locking spring 44, special nut 42 is tightened down until it draws foot 72 up firmly against the top edge of hole 28 in guide tube 12. Retaining ring 52 is applied as shown in FIG. 9 to prevent special nut 42 from backing off. In FIG. 4 is seen pin 38 before nut 42 is turned to raise foot 72 against the top surface of hole 28.

To unlock the above-described quick opening and anti-vibration device, for the purpose of removing and replacing absorber plate 34, for example, special nut 42 is loosened slightly and flux wire assembly 90 is removed. A wrench is applied to locking spring shield 48 with clockwise motion to rotate hold-down handle 46 and hold-down pin 38 clockwise to the unlocked position with foot 72 out of hole 28. Assembly 16 then can be removed from safety rod assembly 10 and absorber plate 34 replaced.

In the construction just described it will be seen that it is convenient and easy to disconnect the absorber section containing the poison material from the safety rod and replace it with a new assembly. In addition it is apparent that the assembly is locked in place in such a way that the assembly will have no vertical movement, even under severe vibrational conditions.

While only a preferred embodiment of the invention has been described, the scope of the invention is not to be limited thereby but is to be defined only by the scope of the appended claims.

I claim:

1. Apparatus for attaching a neutron absorbing material to a safety rod comprising a slot formed in said rod, a plate of said absorbing material, support means attached to said plate for being clamped to said rod with said plate therebetween, said support means and said plate each having openings aligned with said slot, said support means having a shoulder overlapping the edges of said plate and said rod, clamping means mounted on said shoulder for releasably holding said support means, plate, and rod together, said clamping means including a locking pin extending through said shoulder into said opening of said plate and having a transverse foot at the lower end of said pin, means for rotating said pin between a first position wherein said foot passes through the opening in said rod and a second position wherein said foot is disposed wholly within the width of said plate to permit removal of the latter, and means for raising said pin when in said first position to tighten said foot against the upper edge of the opening in said rod to lock the assembly of support means, plate and rod against relative vertical motion of the parts.

2. The apparatus of claim 1 in which said raising means includes a threaded nut having axially arranged ridges and a locking spring with extended tabs to engage said ridges to prevent rotation of said threaded nut and thereby maintaining the pin in a locked position.

3. The apparatus of claim 1 in which said rotating means is a curved lever arm pivoted at said pin for alignment with said shoulder when in a locked position and means for pinning said arm into its locked position.

4. Quick opening anti-vibration latch apparatus for attaching a plate-like element to one end of an elongated member, said element and member each having an opening aligned with each other when assembled, comprising, support means extending over said element for clamping to said member with said element therebetween, said support means having a shoulder overlapping the ends of said member and element, pin means extending through said shoulder and terminating in the opening of said element, the lowermost portion of said pin means having a transverse extension, means above said shoulder for rotating said pin means between a first position wherein said extension extends through the opening in said member and a second posititon wherein said extension is enclosed entirely within the opening in said element, and means for raising said pin means when in the first position to clamp said extension against the top of the opening in said member.

5. The apparatus of claim 4 wherein said rotating means is flush against said shoulder when said pin means is in said first position.

6. The apparatus of claim 5 having means to lock said rotating means against movement when flush against said shoulder.

7. The apparatus of claim 6 having means to lock said pin clamping means against loosening.

8. The apparatus of claim 7 in which the lock means includes a threaded member to tighten said pin means with said extension against the top of the member opening and means for releasably preventing said threaded member from rotating under conditions of vibration.

No references cited.

LEON D. ROSDOL, *Primary Examiner.*

H. E. BEHREND, *Assistant Examiner.*